(12) United States Patent
Lee et al.

(10) Patent No.: US 6,593,980 B2
(45) Date of Patent: Jul. 15, 2003

(54) LIQUID CRYSTAL DISPLAY DEVICE HAVING A LIGHT GUIDING PLATE WITH A NOVEL STRUCTURE

(75) Inventors: Keun-Woo Lee, Gyeonggi-do (KR); Kyoung-Don Lee, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 185 days.

(21) Appl. No.: 09/886,006

(22) Filed: Jun. 22, 2001

(65) Prior Publication Data

US 2001/0055078 A1 Dec. 27, 2001

(30) Foreign Application Priority Data

Jun. 23, 2000 (KR) .......................................... 2000-34903

(51) Int. Cl.[7] .............................................. G02F 1/1336
(52) U.S. Cl. ........................................................ 349/65
(58) Field of Search ...................... 379/65, 112; 362/31

(56) References Cited

U.S. PATENT DOCUMENTS 6,295,105 B1 * 9/2001 Lee et al. ...................... 349/65
6,474,827 B2 * 11/2002 Shinohara et al. ............ 362/31
6,486,931 B1 * 11/2002 Ueda ............................. 349/65
6,504,589 B1 * 1/2003 Kashima et al. .............. 349/96

* cited by examiner

Primary Examiner—James Dudek
(74) Attorney, Agent, or Firm—McGuireWoods LLP; Hae-Chan Park (57) ABSTRACT

A liquid crystal display device has a light guiding plate with a novel structure. The liquid crystal display device has a back light assembly including a light source and the light guiding plate, a display unit for displaying an image and a case for fixedly receiving the back light assembly and the display unit. The light guiding plate is formed at a bottom portion thereof with a light diffusing pattern for uniformly outputting the incident light. A light dispersing member for dispersing the light in the light guiding plate is provided in the light guiding plate. The leaking light is outputted towards the display unit by contacting with the dispersing particles of the light dispersing member, so the light efficiency and the brightness are improved.

16 Claims, 7 Drawing Sheets

LIQUID CRYSTAL DISPLAY DEVICE HAVING A LIGHT GUIDING PLATE WITH A NOVEL STRUCTURE

BACKGROUND OF THE INVENTION

1. Field of the Invention

The present invention relates to a backlight assembly for a liquid crystal display device and a liquid crystal display device having the same. More particularly, the present invention relates to a liquid crystal display device having a light guiding plate with a novel structure, in which dispersing particles are distributed in the light guiding plate and a light diffusing pattern is formed on a rear portion of the light guiding plate, thereby improving the brightness and the light efficiency of the liquid crystal display device.

2. Description of the Related Arts

A cathode ray tube is generally used as a monitor in a television set, a measuring instrument and an information appliance. Since the cathode ray tube is relatively heavy and voluminous, it does not match with the trend of the miniaturization and light weight requirements of the electronic appliance.

In order to solve the above problem, a liquid crystal display device, which displays information by using the electrical and optical features of liquid crystal filled in a liquid crystal display panel, is developed. The liquid crystal display device not only can match with the miniaturization and light weight requirements of the electronic appliance, but also can reduce the waste of the electric power. Recently, the liquid crystal display device is used in a flat display panel device.

In the liquid crystal display device, a voltage is applied to a predetermined molecule alignment of the liquid crystal so that the molecule alignment of the liquid crystal is changed. By changing the molecule alignment of the liquid crystal, the optical features of liquid crystal cells, such as, birefringence, circumpolarization, dichroism and light scattering features are changed so that an image is variously displayed. That is, the liquid crystal display device modulates the light by using the liquid crystal cells. The liquid crystal display device is classified into a twisted nematic type and a super twisted nematic type. In addition, according to the driving method, the liquid crystal display device classified into an active matrix display type which uses a switching device and a twisted nematic liquid crystal and a passive matrix display type which uses a super twisted nematic liquid crystal.

The liquid crystal filled between a TFT (thin film transistor) substrate and a color filter substrate is a light receiving material which displays information in a screen by adjusting the amount of light incident from an exterior, so the liquid crystal display device requires a separate light source, such as a back light assembly for radiating the light into the liquid crystal display panel.

Since the back light assembly uses a great amount of energy in the liquid crystal display device, the size and the light efficiency of the back light assembly are closely related to mechanical/optical features of the liquid crystal display device. Recently, various kinds of back light assemblies are developed to improve the brightness and the light efficiency of the back light assembly and to reduce the waste of the electric power. The back light assembly is divided into a vertical type and an edge type according to the position of a light source and is divided into a flat type and an inclined type according to the shape of a light guiding plate. Preferably, a back light assembly with the edge type having an inclined light guiding plate is used to reduce the weight, to improve the brightness and to uniformly radiate the light.

Examples of the liquid crystal display devices are disclosed in U.S. Pat. No. 5,502,582 entitled "Light source cooler for LCD monitor", U.S. Pat. No. 5,791,770 entitled "Light source cooler for LCD monitor" and U.S. Pat. No. 5,825,614 entitled "Compact personal computer with a LCD monitor".

The amount of the light inputted into the light guiding plate of the back light assembly is different depending on the distance from the light source. In order to solve the above problem, U.S. Pat. No. 5,178,447 discloses the light guiding plate that can improve the brightness of the light and can uniformly distribute the light proceeding in the direction of a LCD panel.

Figure 1:
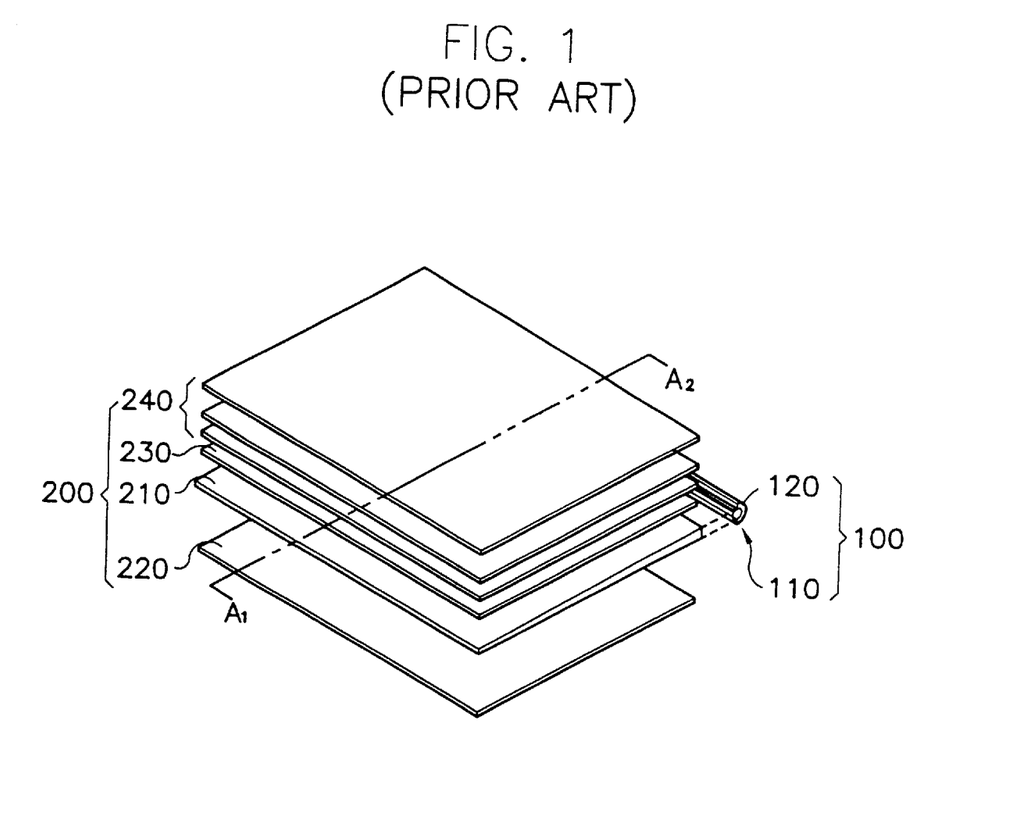
FIG. 1 is a perspective view showing a conventional back light assembly for a liquid crystal display device.
Figure 2:
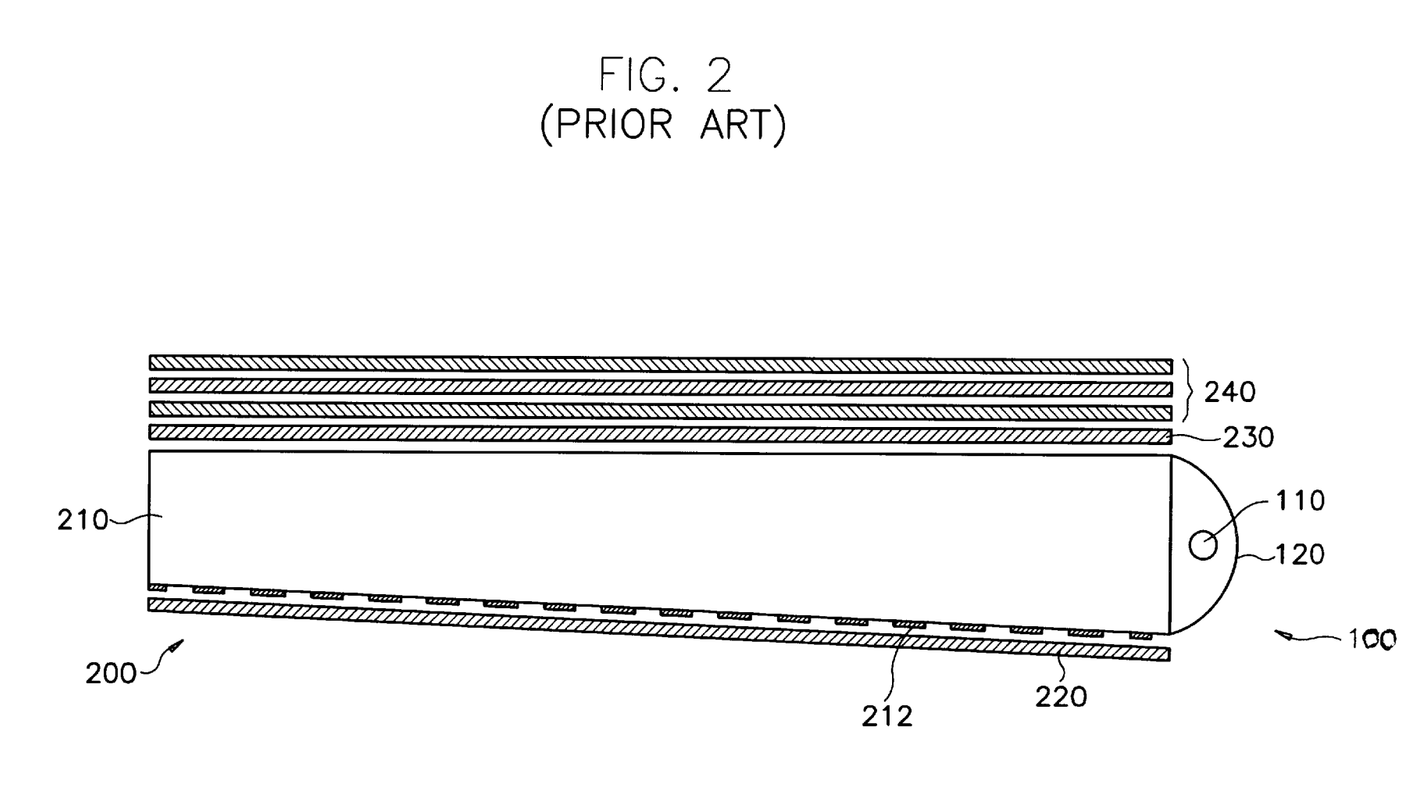
FIG. 2 is a sectional view of the back light assembly cut along a line "$A_1$–$A_2$" shown in FIG. 1.

FIG. 1 is a perspective view showing conventional back light assembly for a liquid crystal display device and FIG. 2 is a sectional view of the liquid crystal display device cut along a line "$A_1$–$A_2$" portion shown in FIG. 1.

Referring to FIGS. 1 and 2, the back light assembly for a liquid crystal display device consists of a lamp unit 100 and a light guiding unit 200. The lamp unit 100 includes a lamp 110 as light source and a lamp reflector 120 surrounding the lamp 110.

A cold cathode tube is preferably used as the lamp 110. The light generated from the lamp 110 is inputted into a light guiding plate 210.

At this time, since the light from the lamp 110 is omni-directionally radiated, the light radiated to a direction reverse to the light guiding plate 210 have to be reflected towards the light guiding plate 210 by the lamp reflector 120 so as to improve the light efficiency.

The light guiding unit 200 includes a reflection plate 220, the light guiding plate 210, a diffusing sheet and a plurality of light focusing sheets 240.

The light guiding plate 210 is comprised of a transparent plastic material, such as an acryl resin. The light guiding plate 210 is in the form of a panel having an inclined rear surface, a horizontal light output surface, a light incident surface and a side surface. The light from the lamp 110 proceeds towards a liquid crystal display device (not shown) via the light output surface of the light guiding plate 210.

At this time, in order to convert the direction of the light towards the liquid crystal display device, a diffusing ink 212 in the form of a dot pattern is printed on the rear surface of the light guiding plate 210. The diffusing ink pattern 212 turbulently reflects, the light inputted into the light guiding plate 210. Accordingly, the light inputted into the light output surface has an incident angle less than a critical angle of the light guiding plate 210, so that the light is easily guided into a liquid crystal display panel (not shown).

In order to improve the uniformity of the light going to the liquid crystal display panel, the density of the diffusing ink pattern 212 varies depending on where it is formed on the rear surface of the light guiding plate. That is, the density of the diffusing ink pattern 212 is higher as it is more remote from the light source.

The reflection plate 220 is formed on the rear surface of the light guiding plate 210. The diffusing sheet 230 and the focusing sheets 240 are sequentially stacked on the light guiding plate 210.

The reflection plate 220 reflects the light, which is not reflected by the diffusing ink 212, towards the light output surface of the light guiding plate, so the loss of the light can be reduced when it is inputted into the liquid crystal display panel and the uniformity of the light passing through the light output surface of the light guiding plate 210 can be improved.

The diffusing sheet 230 positioned between the light guiding plate 210 and the light focusing sheets 240 refracts the output light, which has a predetermined inclination with respect to the light output surface, towards the liquid crystal display panel thereby improving the front brightness.

The light focusing sheets 240 is positioned between the diffusing plate 230 and the liquid crystal display panel. The light focusing sheets 240 has a plurality of sheets in the shape of a triangular prism having a predetermined arrangement. The light focusing sheets 240 are offset from each other by a predetermined angle. The light focusing sheets 240 reduce the visual angle of the light incident from the diffusing sheets 230 so that the front brightness of the light inputted into the liquid crystal display panel can be improved. Accordingly, the electric power can be saved. Generally, the light focusing sheets 240 include a protecting sheet for protecting the prism sheets. The liquid crystal display panel is installed on the protecting sheet.

However, in the conventional back light assembly, the light source is positioned at one side or both sides of the light guiding plate, so the light inputted into the light guiding plate can be partially leaked through the side surface opposite to the light incident surface. Accordingly, the brightness and the light efficiency of the liquid crystal display panel can be lowered.

Particularly, since the liquid crystal display panel for a monitor has the thickness thicker than the thickness of the liquid crystal display panel for a note book personal computer, the light leakage increases, deteriorating the light efficiency of the liquid crystal display device.

SUMMARY OF THE INVENTION

The present invention has been made to solve the problem of the prior art, and accordingly, it is a first object of the present invention to provide a liquid crystal display device that can prevent the light from leaking through a side surface opposite to a light incident surface, thereby improving the light efficiency and the brightness.

A second object of the present invention is to provide a back light assembly having a light guiding plate that can prevent the light from leaking through a side surface of a light guiding plate opposite to a light incident surface.

To accomplish the first object of the present invention, there is provided a liquid crystal display device comprising a back light assembly including a light source for generating a light and a light guiding plate positioned at a side of the light source, a display unit for displaying an image and a container module for receiving the back light assembly and the display unit. The light guiding plate includes a light incident surface for receiving the light from the light source, a side surface positioned opposite to the light incident surface, a light output surface for outputting the light, and a rear surface positioned opposite to the light output surface. The rear surface is formed with a light diffusing portion to uniformly output the light generated from the light source towards the light output surface. The light guiding plate is formed at an inner portion thereof with a light dispersing member for dispersing the light inputted into the light guiding plate.

To accomplish the second object of the present invention, there is provided a back light assembly for a display device comprising a light source for generating a light and a light guiding plate positioned at a side of the light source. The light guiding plate includes a light incident surface for receiving the light from the light source, a side surface positioned opposite to the light incident surface, a light output surface for outputting the light, and a rear surface positioned opposite to the light output surface. The rear surface is formed with a light diffusing portion to uniformly output the light generated from the light source towards the light output surface. The light guiding plate is formed at an inner portion thereof with a light dispersing member for dispersing the light inputted into the light guiding plate.

According to the present invention, the light leaking through the side surface is outputted to the output surface by making contact with the dispersing particles of the light dispersing member, so the light efficiency and the brightness are improved.

BRIEF DESCRIPTION OF THE DRAWINGS

The above objects and other advantages of the present invention will become more apparent by describing in detail preferred embodiments thereof with reference to the attached drawings, in which.

DESCRIPTION OF THE PREFERRED EMBODIMENT

Hereinafter, the present invention will be described in detail with reference to the accompanying drawings. In this application, a back light assembly used in a monitor for a computer is explained as an example of back light assemblies.

Figure 3:
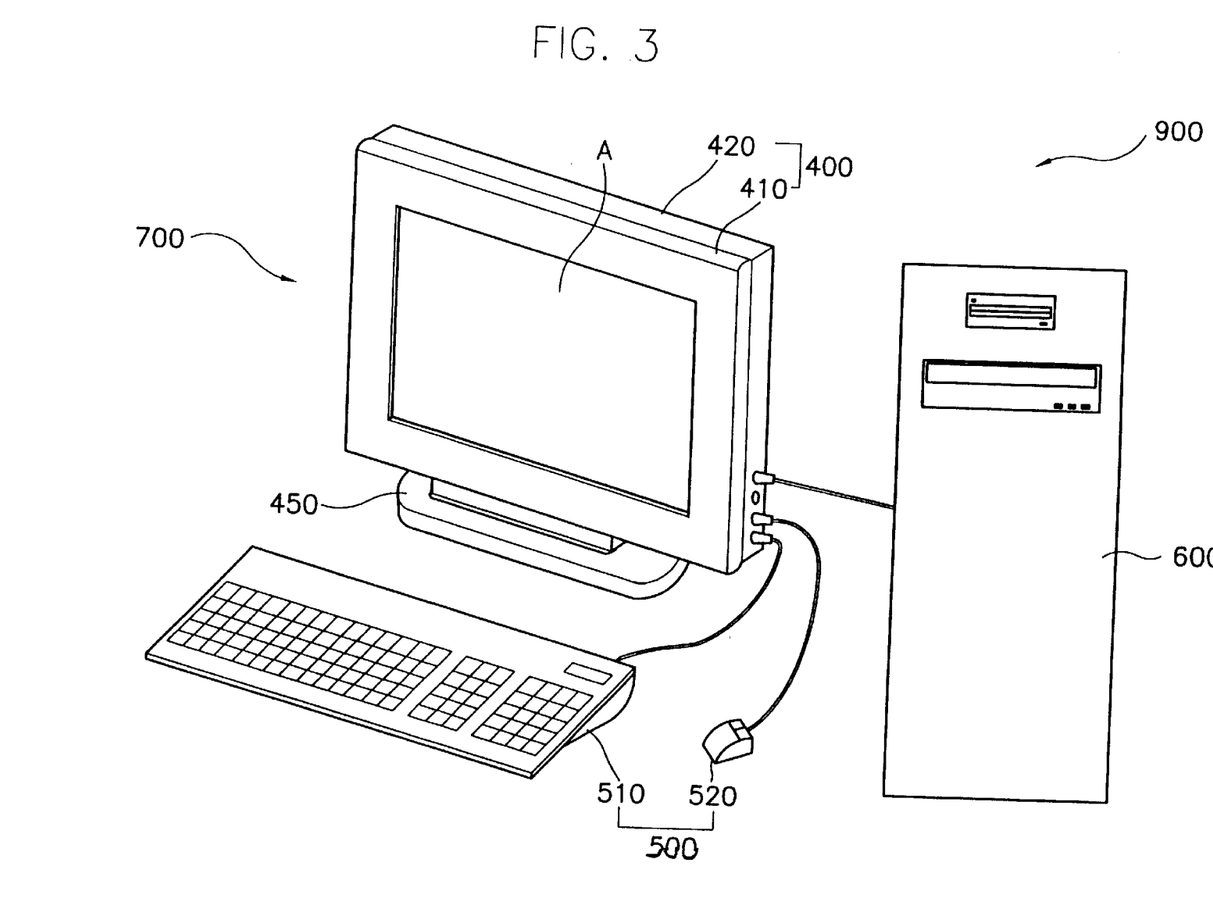
FIG. 3 is a schematic view showing a liquid crystal display device according to one embodiment of the present invention.

FIG. 3 shows a schematic perspective view of a liquid crystal display device according to one embodiment of the present invention.

Referring to FIG. 3, a computer system 900 has an input device 500 having a key board 510 and a mouse 520, a body 600 having logic and calculating circuits and a storing device and a monitor 700 for displaying information as image.

Data inputted by the input device 500 are processed by the logic and calculating circuits of the body 600 and are stored in the storing device or outputted to the monitor 700.

The monitor 700 is a liquid crystal display device that can reduce the waste of the electric power with a light weight and a thin structure. The liquid crystal display device includes an image displaying portion A and a case 400 for receiving the image displaying portion A. A supporting plate 450 is formed at a lower portion of the case 400 for supporting the monitor 700. The case 400 has a bottom chassis 420 having a receiving space with a rectangular ring shape and a top chassis 410 having an opening portion for mounting the image displaying portion A. The bottom chassis 420 is coupled to the top chassis 410 so as to form the case 400.

Figure 4:
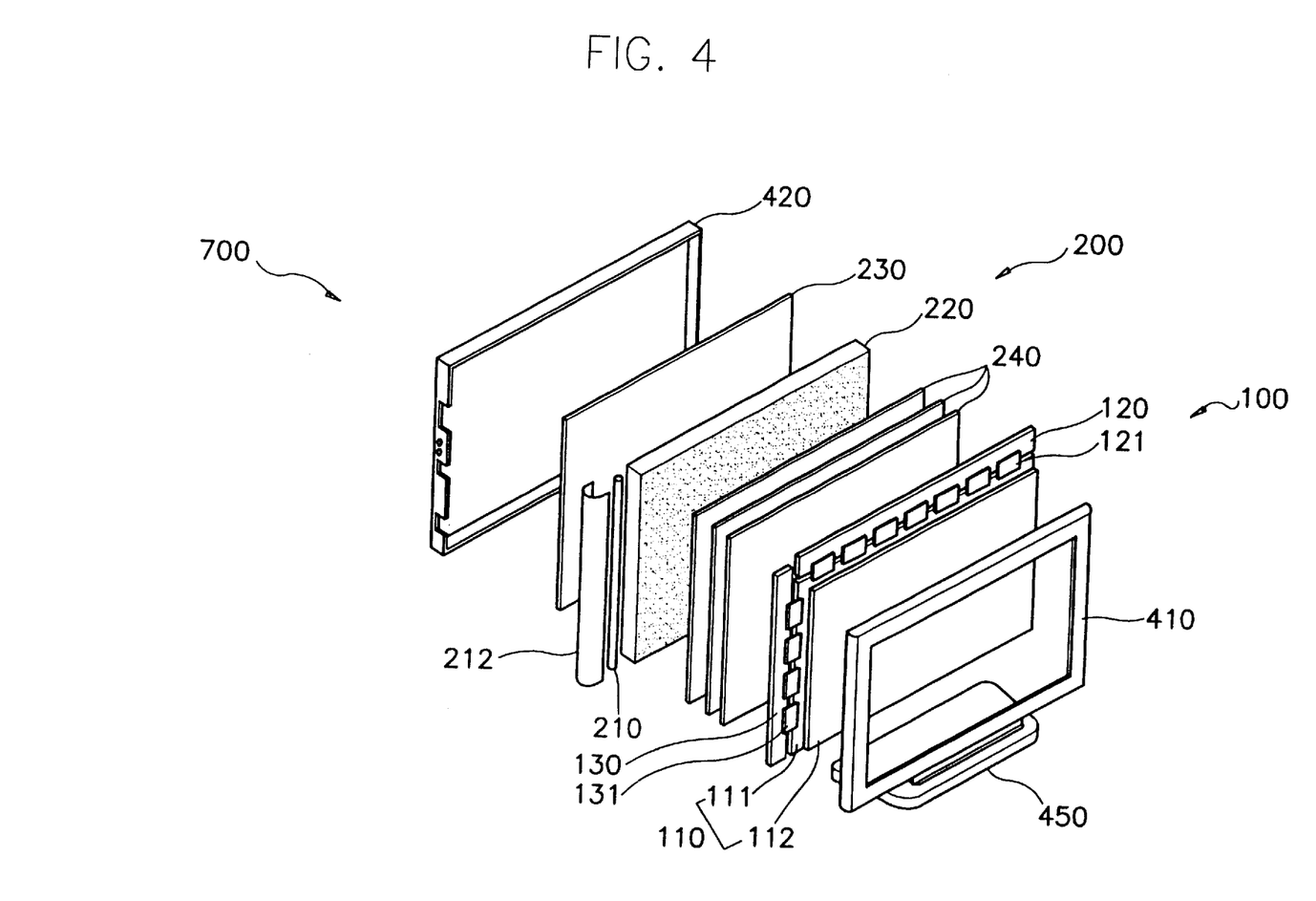
FIG. 4 is a schematic exploded view showing a liquid crystal display device according to one embodiment of the present invention.

FIG. 4 is a schematic exploded perspective view of the liquid crystal display device according to one embodiment of the present invention.

Referring to FIG. 4, the liquid crystal display device 700 includes a display unit 100 for displaying an image, a back light assembly 200 for supplying light to the display unit 100, the bottom chassis 420 for receiving the display unit 100 and the back light assembly 200 and the top chassis 410 for fixing the display unit and the back light assembly to the bottom chassis 420.

The display unit 100 includes a liquid crystal display panel 110 for displaying the image, a source side printed circuit board 120 for applying a driving signal to a data line, a source side tape carrier package 121 for determining the timing for the data driving signal, a gate side soft circuit board 130 for applying a driving signal to a gate line, and a gate side tape carrier package 131 for determining the time for applying the gate driving signal. The liquid crystal display panel 110 consists of a thin film transistor substrate 111, a color filter substrate 112 and a liquid crystal (not shown) provided between the thin film transistor substrate 111 and the color filter substrate 112.

The thin film transistor substrate 111 is a transparent glass substrate formed with thin film transistors arranged in a matrix format. The data line is connected to a source terminal of the thin film transistor on substrate 111 and the gate line is connected to a gate terminal of the thin film transistor on substrate 111. In addition, a pixel electrode made of indium tin oxide (ITO) is connected to a drain terminal of the thin film transistor on substrate 111.

The light passes through the color filter substrate 112 in which R.G.B pixels are formed by a thin film manufacturing process. A common electrode made of ITO is coated on a front portion of the color filter substrate 112.

When the electric power is applied to the gate terminal and the source terminal of the thin film transistor substrate 111, an electric field is formed between the pixel electrode and the common electrode of the color filter substrate 112. The electric field changes the angles of liquid crystal particles which are filled between the thin film transistor substrate 111 and the color filter substrate 112 so that the light transmission ratio is changed, thereby obtaining desired images.

At this time, in order to control the driving signal applied to the data line and the gate line and the timing signal, the source side tape carrier package 121 having a driving integral circuit and the gate side tape carrier package 131 are provided.

The back light assembly 200 is provided below the display unit 100 so as to uniformly radiate the light towards the display unit 100. The back light assembly 200 consists of a lamp unit and a light guiding unit. The lamp unit includes a lamp 210 as light source and a lamp reflector 212 to surround the lamp. The light guiding unit includes a light guiding plate 220, a reflection plate 230 and optical sheets 240.

A cold cathode ray tube is preferably used as the lamp 210. The lamp 210 is positioned at a side or both sides of the light guiding plate 220. The light from the lamp 210 is inputted into the light guiding plate 220. The lamp reflector 212 reflects the light towards the light guiding plate 220.

The light guiding plate 220 has a size corresponding to a size of the liquid crystal display panel 110 and is positioned below the liquid crystal display panel 110. The light generated from the lamp 210 is guided towards the display unit 100 by the light guiding plate 220.

In order to convert the direction of the light towards the liquid crystal display panel 110, a diffusing pattern having a dot shape is printed on the rear surface of the light guiding plate 220. Dispersing particles for dispersing the light are distributed in the light guiding plate 220.

Accordingly, the light that goes straight towards the side surface of the light guiding plate 220 is dispersed by making contact with the dispersing particles and is diffused towards the light output surface by the diffusing pattern, the light leakage and improve the brightness.

The reflection plate 230 for enhancing the light efficiency is positioned below the light guiding plate 220. The reflection plate 230 reflects the light leaking from the light guiding plate 220 towards the light guiding plate 220. A plurality of optical sheets 240 are provided above the light guiding plate 220 to have it uniform the brightness of the light incident from the light guiding plate 220 into the liquid crystal display panel. The optical sheets 240 include a diffusing sheet for diffusing the light inputted to the light guiding plate 220, a light focusing sheet for focusing the diffused light in a direction vertical to the liquid crystal display panel 110, and a protecting sheet for protecting the surface of the light focusing sheet.

The back light assembly 200 and the display unit 100 contained in the bottom chassis 420 are sequentially stacked on the bottom portion of the bottom chassis 420. The bottom chassis 420 has a hexagonal box shape or a rectangular ring shape and an upper portion of the bottom chassis 420 is opened. That is, the bottom chassis 420 has four side walls and a bottom surface. An opening portion is formed at the side wall to transfer the electric power to the lamp 210.

After the display unit 100 and the back light assembly 200 are received in the bottom chassis 420, the top chassis 410 is coupled to the bottom chassis 420 so as to fix the display unit 100 and the back light assembly 200 to a lower portion of the bottom chassis 420. The top chassis 410 also has a hexagonal shape corresponding to the bottom chassis 420. An upper portion of the top chassis 410 is open to expose the liquid crystal display panel 110 and a side wall of the top chassis 410 is vertically bent so as to cover an upper periphery portion of the display unit 100. The supporting plate for supporting the top chassis 410 is integrally formed with the top chassis 410.

As mentioned above, coupling the top chassis 410 to the bottom chassis 420 containing the display unit 100 and the back light assembly 200 completes the assembling of the liquid crystal display device 700 of the present invention.

Hereinafter, the structure and the function of the light guiding plate 220 will be explained, in detail.

Figure 5:
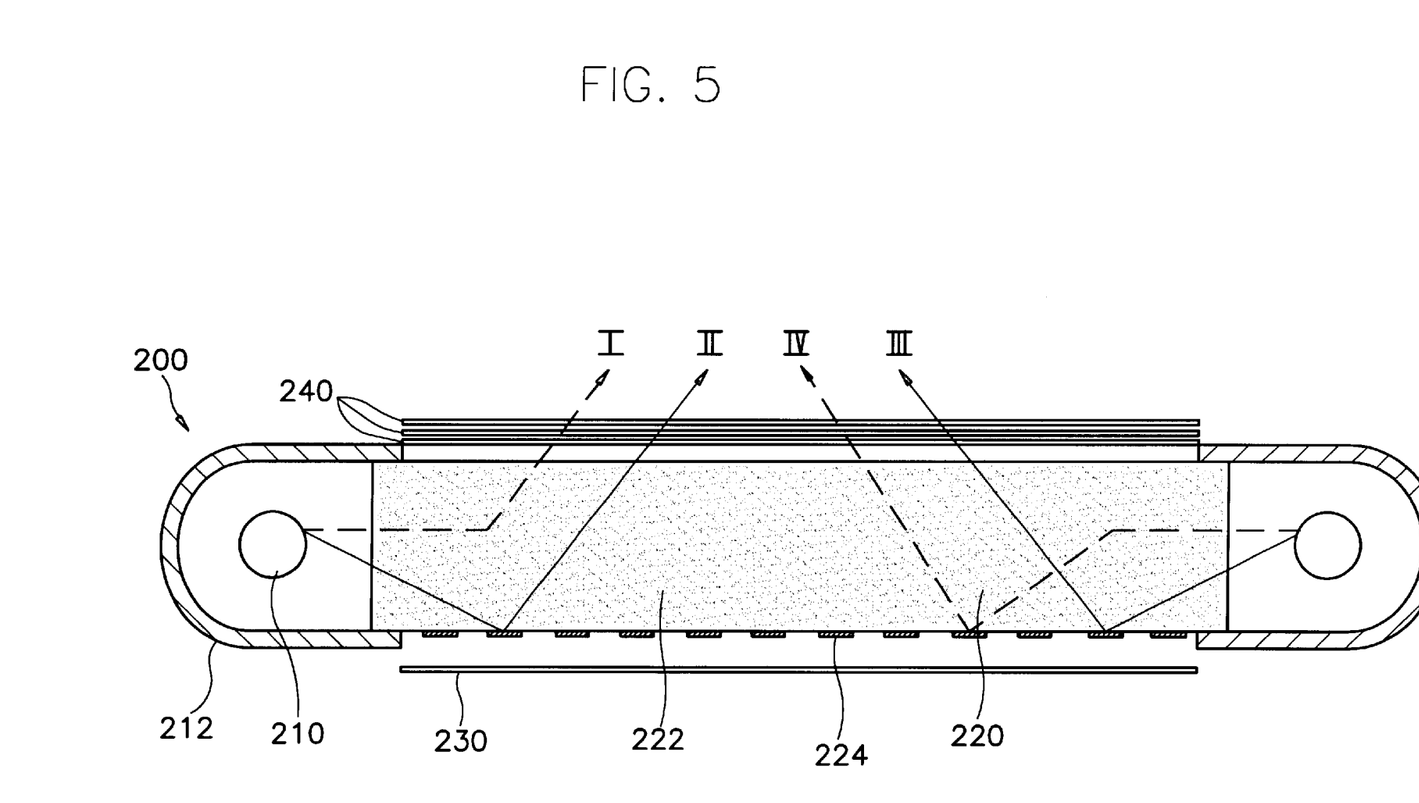
FIG. 5 is a sectional view of a back light assembly according to one embodiment of the present invention.

FIG. 5 is a sectional view showing the back light assembly according to one embodiment of the present invention.

As mentioned above, the back light assembly 200 has the light guiding plate 220 having a predetermined thickness with a flat plate shape and a pair of lamps 210 which are positioned at both side ends of the light guiding plate 220.

The light guiding plate 220 guides the light from the lamp 210 towards the display unit 100. In order to convert the direction of the light towards the liquid crystal display panel 110, a diffusing pattern 224 having a fine dot shape is printed on the rear surface of the light guiding plate 220. Dispersing particles 220 for dispersing the light are distributed in the light guiding plate 220.

The light diffusing pattern 224 consists essentially of polymethyl methacrylate (PMMA). In order to enhance the adhesive force, polyvinyl-alcohol (PVA) is added to PMMA. After dissolving the PMMA and PVA by using an organic solvent, an ink mixed with a light dispersing agent is screen-printed on the rear surface of the light guiding plate 220. It is also possible to directly form the dispersing member to the light guiding plate 220. In addition, the incident light can be reflected through a hole having a prism shape. The light can be outputted by coating a dispersing agent on the reflection surface. The hole can be formed in various shapes such as a convex lens shape, a concave lens shape, a trapezoid shape or a hexagonal shape.

The light diffusing pattern 224 turbulently reflects the light inputted into the light guiding plate 220. Accordingly, the light inputted into the light output surface of the light guiding plate 220 has an incident angle less than a critical angle of the light guiding plate 210, so that the quality of the light outputted towards the liquid crystal display panel 110 is improved. In addition, a size of the light diffusing pattern 224 in an area adjacent to the lamp 210 is relatively small to reduce the amount of the diffusing light directed towards the output surface. On the other hand, a size of the light diffusing pattern 224 in an area away from the lamp 210 is relatively large to increase the amount of the diffusing light directed towards the output surface. Accordingly, the uniformity of the light at the output surface of the light guiding plate 220 is improved.

In addition, the dispersing particles 222 distributed in the light guiding plate 220 are integrally formed with the light guiding plate 220. The dispersing particles 222 are comprised of an organic polymer (such as PMMA) that does not influence the characteristic of the light and that is capable of changing the direction of the leaking light. Since the dispersing particles 222 are formed by using fine particles, the dispersing particles 222 have a high dispersing effect and do not require a large space in the light guiding plate 220. Preferably, the total volume of the dispersing particles 222 is not more than 10 percent of the total volume of the light guiding plate 220.

In addition, the distributing density of the dispersing particles at the light incident surface is higher than the distributing density of the dispersing particles at the side surface so that the uniformity of the light can be further improved. The light proceeding straight in the light guiding plate 220 makes contact with the dispersing particles 222 and is outputted through the output surface of the light guiding plate 220. Otherwise, the light proceeds towards the rear surface and is dispersed by the light diffusing pattern 224 before the light is outputted through the output surface of the light guiding plate 220. Since the density of the dispersing particles 222 is higher as it is more remote from the light incident surface, the density of the outputted light is also higher as it is more remote from the light incident surface. Accordingly, the density of the light in the light incident surface and in an area remote from the light incident area can be uniformly formed.

By forming the light diffusing pattern 224 on the rear surface of the light guiding plate 222 and by distributing the dispersing particles 222 in an inner space between the light output surface and the rear surface, the leakage of the light is reduced and the brightness of the light is improved. Among the lights inputted into the light guiding plate 220, the lights II and III directly reflected from the light diffusing pattern 224 are outputted through the output surface of the light guiding plate 220. The lights I and IV going straight towards the side surface of the light guiding plate 220 make contact with the dispersing particles 222. Then, the light IV is outputted through the light output surface of the light guiding plate 220 and the light IV proceeds towards the rear side of the light guiding plate 220 and is reflected from the light diffusing pattern 224 before the light IV is outputted through the light output surface.

FIGS. 6A, 6B, 6C and 6D are views for comparing the brightness between the conventional back light assembly and the back light assembly of the present invention.

Figure 6A:
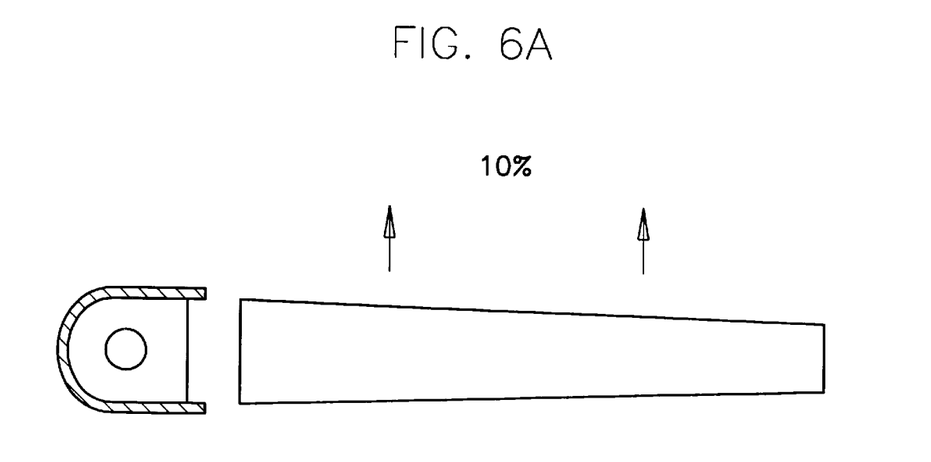
FIGS. 6A, 6B, 6C and 6D are views for comparing the brightness between the conventional back light assembly and the back light assembly of the present invention.
Figure 6B:
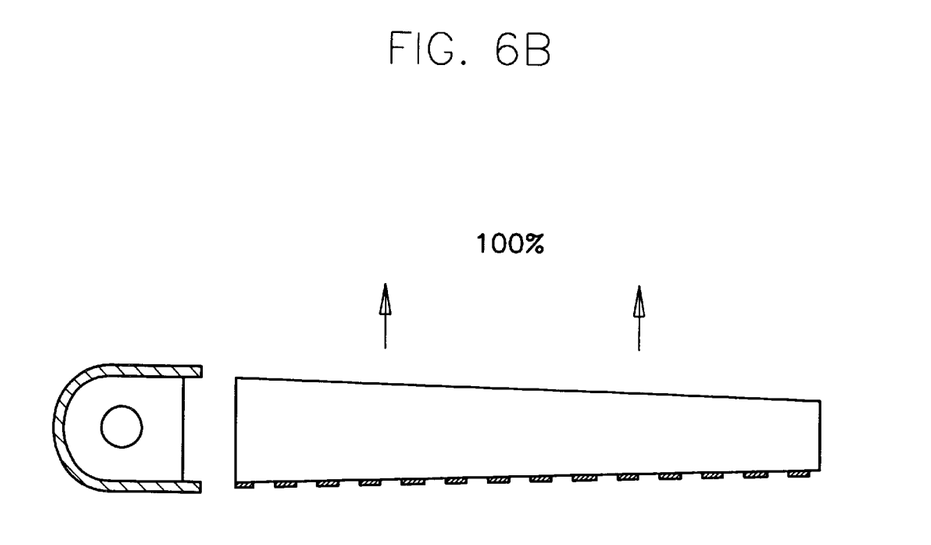
Figure 6C:
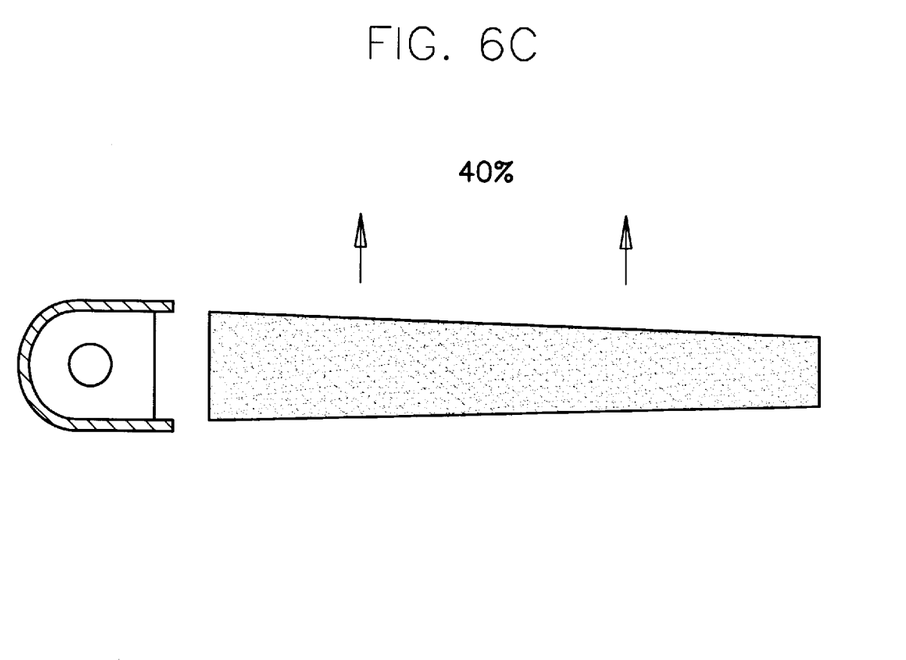
Figure 6D:
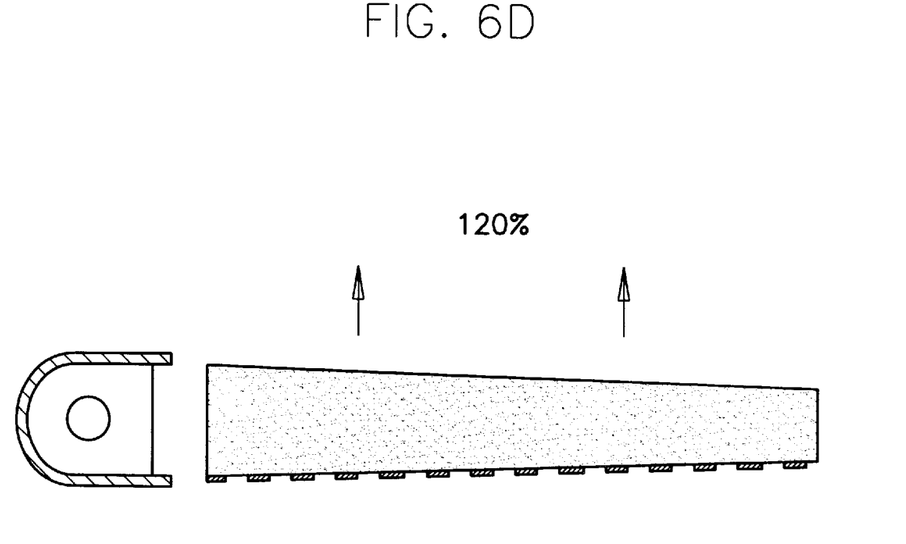

FIG. 6A is a view showing the brightness of a first back light assembly having a light guiding plate without the light diffusing pattern and the dispersing particles. FIG. 6B is a view showing the brightness of a second back light assembly having a light guiding plate formed with the light diffusing pattern. FIG. 6C is a view showing the brightness of a third back light assembly having a light guiding plate formed with the dispersing particles. FIG. 6D is a view showing the brightness of a fourth back light assembly having a light guiding plate formed with the light diffusing pattern and the dispersing particles.

When the brightness of the second back light assembly, which is generally used, is set to 100%, the brightness of the first, third and fourth back light assemblies are measured to 10%, 40% and 120%, respectively.

Accordingly, the brightness of the fourth back light assembly formed with the light diffusing pattern and the dispersing particles is improved as compared with the first to third back light assemblies.

The third back light assembly formed with the dispersing particles cannot output the light, which is dispersed towards the rear surface of the light guiding plate by making contact with the dispersing particles, in the direction of the light output surface and lowers the brightness. In the second back light assembly formed with the light diffusing pattern, the light is leaked through the side surface of the light guiding plate so that the light efficiency is reduced.

However, in the fourth back light assembly formed with the light diffusing pattern and the light dispersing particles, the light, which is dispersed towards the rear surface of the light guiding plate by making contact with the dispersing particles, can be outputted in the direction of the light output surface by the light diffusing pattern so that the brightness can be improved. In addition, the light is prevented from leaking through the side surface of the light guiding plate by the light dispersing particles, so that the light efficiency can be improved.

The back light assembly of the present invention can be applied to the various electronic appliances, such as a note book computer, a desktop computer and a digital camera with a decoder.

Although a preferred embodiment of the invention has been described, it will be understood by those skilled in the art that the present invention should not be limited to the described preferred embodiment, but various changes and modifications can be made within the spirit and scope of the invention as defined by the appended claims.

What is claimed is:

1. A liquid crystal display device, comprising:
   a back light assembly including a light source and a light guiding plate positioned at a side of the light source, the light guiding plate including a light incident surface for receiving a light from the light source, a side surface positioned opposite to the light incident surface, a light output surface for outputting the light, and a rear surface positioned opposite to the light output surface, the rear surface being formed with a light diffusing portion for uniformly outputting the light generated from the light source towards the light output surface, the light guiding plate being formed at an inner portion thereof with a light dispersing member for dispersing the light inputted into the light guiding plate;

a display unit for displaying an image; and a container module for receiving the back light assembly and the display unit.

2. The liquid crystal display device as claimed in claim 1, wherein the light diffusing portion is a screen printed pattern layer.

3. The liquid crystal display device as claimed in claim 2, wherein the light diffusing portion is comprised of polymethyl methacrylate.

4. The liquid crystal display device as claimed in claim 1, wherein the light diffusing portion is directly formed on the light guiding plate.

5. The liquid crystal display device as claimed in claim 4, wherein the light diffusing portion has a prism shape, a convex lens shape, a concave lens shape, a trapezoid shape or a hexagonal shape.

6. The liquid crystal display device as claimed in claim 1, wherein a density of the light diffusing portion becomes higher as the light diffusing portion is more remote from the light incident surface.

7. The liquid crystal display device as claimed in claim 1, wherein the light dispersing member is randomly distributed in the light guiding plate.

8. The liquid crystal display device as claimed in claim 7, wherein the light dispersing member is comprised of fine particles.

9. The liquid crystal display device as claimed in claim 7, wherein the light dispersing member is comprised of an organic polymer.

10. The liquid crystal display device as claimed in claim 7, wherein a total volume of the light dispersing member is no more than 10 percent of a total volume of the light guiding plate.

11. The liquid crystal display device as claimed in claim 7, wherein a density of the light dispersing member becomes higher as the light dispersing member is more remote from the light incident surface.

12. The liquid crystal display device as claimed in claim 1, further comprising a reflection plate for reflecting the light leaked from the rear surface towards the light output surface, the reflection plate being positioned at a lower portion of the light guiding plate.

13. The liquid crystal display device as claimed in claim 1, further comprising a light adjusting means for focusing the light inputted into the light guiding plate to a direction of the display unit, the light adjusting means being positioned adjacent to the display unit.

14. A back light assembly for a display device, comprising:

a light source; and a light guiding plate positioned at a side of the light source, the light guiding plate including a light incident surface for receiving a light from the light source, a side surface positioned in opposite to the light incident surface, a light output surface for outputting the light, and a rear surface positioned in opposite to the light output surface, the rear surface being formed with a light diffusing portion for uniformly outputting the light generated from the light source towards the light output surface, the light guiding plate being formed at an inner portion thereof with a light dispersing member for dispersing the light inputted into the light guiding plate.

15. The back light assembly as claimed in claim 14, further comprising a reflection plate for reflecting the light leaking from the rear surface towards the light output surface, the reflection plate being positioned at a lower portion of the light guiding plate.

16. The back light assembly as claimed in claim 14, further comprising a light adjusting means for focusing the light outputted from the light guiding plate, the light adjusting means being positioned adjacent to the light output surface of the light guiding plate.

* * * * *